(12) United States Patent
Nowottnick

(10) Patent No.: US 8,907,760 B2
(45) Date of Patent: Dec. 9, 2014

(54) MULTIPLE-FREQUENCY SOLUTIONS FOR REMOTE ACCESS SYSTEMS

(75) Inventor: Juergen Nowottnick, Hamburg (DE)

(73) Assignee: NXP B.V., Eindhoven (NL)

(*) Notice: Subject to any disclaimer, the term of this patent is extended or adjusted under 35 U.S.C. 154(b) by 519 days.

(21) Appl. No.: 12/878,349

(22) Filed: Sep. 9, 2010

(65) Prior Publication Data
US 2012/0062358 A1    Mar. 15, 2012

(51) Int. Cl.
| | | |
|---|---|---|
| *G06F 7/04* | (2006.01) |
| *H01Q 1/32* | (2006.01) |
| *G06K 19/077* | (2006.01) |
| *H01Q 5/00* | (2006.01) |
| *H01Q 7/00* | (2006.01) |
| *H01Q 25/00* | (2006.01) |

(52) U.S. Cl.
CPC ........ *H01Q 1/3241* (2013.01); *G06K 19/07767* (2013.01); *G06K 19/07792* (2013.01); *H01Q 5/0048* (2013.01); *H01Q 7/00* (2013.01); *H01Q 25/00* (2013.01)
USPC .......................................... 340/5.2; 343/867

(58) Field of Classification Search
CPC .................................................. G07C 2209/63
USPC ........... 340/5.2, 854.8, 426.36, 10.1, 5.1, 5.6, 340/572.1, 572.7; 343/866, 867
See application file for complete search history.

(56) References Cited

U.S. PATENT DOCUMENTS

| | | | | |
|---|---|---|---|---|
| 5,923,300 | A * | 7/1999 | Mejia .............................. 343/788 |
| 6,359,348 | B1 * | 3/2002 | King .............................. 307/10.1 |
| 6,937,136 | B2 * | 8/2005 | Greenwood et al. .......... 340/5.61 |
| 6,995,729 | B2 * | 2/2006 | Govari et al. .................. 343/867 |
| 7,123,206 | B2 * | 10/2006 | Hess et al. ..................... 343/788 |
| 7,391,369 | B2 * | 6/2008 | Johanessen et al. ........... 342/389 |
| 7,439,862 | B2 * | 10/2008 | Quan .......................... 340/572.7 |
| 7,602,274 | B2 * | 10/2009 | Lee et al. ...................... 340/10.2 |
| 2002/0080083 | A1 * | 6/2002 | Nantz et al. ................... 343/788 |
| 2007/0115192 | A1 * | 5/2007 | Brandwein, Jr. .............. 343/713 |
| 2009/0001930 | A1 * | 1/2009 | Pohjonen ...................... 320/108 |
| 2010/0039234 | A1 * | 2/2010 | Soliven et al. ............... 340/10.1 |
| 2011/0115605 | A1 * | 5/2011 | Dimig et al. ................. 340/5.61 |

FOREIGN PATENT DOCUMENTS

| | | |
|---|---|---|
| EP | 1 189 306 A1 | 3/2002 |
| EP | 1 313 168 A2 | 5/2003 |
| EP | 1 552 795 A1 | 7/2005 |
| EP | 2005/109328 A1 | 11/2005 |

(Continued)

OTHER PUBLICATIONS

Extended European Search Report for European Patent Appln. No. 11180550.3 (Dec. 20, 2011).

*Primary Examiner* — Jennifer Mehmood
*Assistant Examiner* — Yong Hang Jiang (57) ABSTRACT

Aspects of the present disclosure are directed toward a system in which a three-dimensional low-frequency (3D-LF) antenna and a high frequency (HF) antenna are used. The 3D-LF antenna includes three coils each oriented relative to X, Y and Z axes that define a Cartesian coordinate system for a three-dimensional space. The HF antenna is oriented along one of the axes of the LF coils and in the same antenna package as the 3D-LF antenna. The 3D-LF antenna is configured to be used in connection with an LF signal of between 3 kHz and 300 kHz. The HF antenna is configured to be used in connection with an HF signal between 3 MHz and 30 MHz.

20 Claims, 7 Drawing Sheets

(56) References Cited

FOREIGN PATENT DOCUMENTS

| GB | 2311399 A | * | 3/1996 | ............ G06K 7/08 |
| WO | 2005/088560 A1 | | 9/2005 | |
| WO | 2010/018546 A1 | | 2/2010 | |

* cited by examiner

MULTIPLE-FREQUENCY SOLUTIONS FOR REMOTE ACCESS SYSTEMS

Remote access systems provide individuals with a convenient and secure access to, for example, vehicles or buildings. A particular type of remote access system involves the use of a base station at the vehicle or building and a portable device, carried by an individual. The base station and portable device can be configured with varying levels of security protocols and additional functionality. This additional security or functionality, however, may result in the portable device having increased size, costs and/or power consumption.

As discussed herein, remote access systems, e.g., for the automotive industry, can be implemented in connection with a portable access device, such as a key fob. The remote access system can be used to unlock vehicle doors, start vehicle engines, open trunks, turn on/off lights and/or various other functions. A particular remote access system is a Passive Keyless Entry (PKE) system. PKE systems can use, for example, three-dimensional low-frequency (3D LF) antennas. The use of 3D LF antennas in the PKE key allows for the PKE key to perform a rotation-independent detection of a wakeup sequence, which can be transmitted from a base station in the vehicle. The PKE key can also measure the field strength of signal(s) transmitted from the vehicle, which can be used to establish the spatial position of the PKE key within the magnetic field caused by the transmitted signal(s). Additional antennas associated with other functionalities, however, can adversely affect the size of the PKE key and are therefore often avoided. For example, the use of an ISO 14443 compliant interface (e.g., a 13.56 MHz carrier frequency) in the key generally requires a larger key due to, for example, the additional PCB space necessary to place a high frequency (HF) antenna.

Certain embodiments of the present disclosure are directed to a communication circuit including a printed circuit board (PCB) and a three-dimensional radio antenna connected to the PCB for receiving a radio frequency signal. The three dimensions include planes X, Y, and Z. The three-dimensional radio antenna includes a first coil oriented in the X plane, a second coil oriented in the Y plane and a third coil oriented in the Z plane. The circuit includes a first communication circuit on the PCB and for communicating a low frequency (LF) signal with a carrier frequency that is between 30 kHz and 300 kHz. The first communication circuit includes one or more processing circuits configured to code communications carried by the LF signal. A first electrical connection provides an LF signal communications path between one or more processing circuit(s) and the first coil. A second electrical connection provides an LF signal communication path between the one or more processing circuit(s) and the second coil. A third electrical connection provides an LF signal communication path between the one or more processing circuit(s) and the third coil.

Certain embodiments of the present disclosure are directed to a multipurpose antenna assembly including a package that includes a first coil antenna oriented in an X plane and configured to receive an LF signal having a carrier frequency between 30 kHz and 300 kHz. A second coil antenna is oriented in a Y plane and configured to receive an LF signal having a carrier frequency between 30 kHz and 300 kHz. A third coil antenna is oriented in the Z plane and configured to receive an LF signal having a carrier frequency between 30 kHz and 300 kHz. A fourth coil antenna is oriented in the Z plane and configured to produce a high frequency (HF) signal having a carrier frequency between 3 MHz and 30 MHz.

The disclosure may be more completely understood in consideration of the detailed description of various embodiments of the disclosure that follows in connection with the accompanying drawings as follows.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

The present disclosure is believed to be useful in a system in which a three-dimensional low-frequency (3D-LF) antenna and a high frequency (HF) antenna are used. Applications include, for example, passive keyless entry (PKE) systems in the automotive industry. While the present disclosure is not necessarily limited to such applications, various aspects of the disclosure may be appreciated through a discussion of various examples using these contexts.

Various embodiments of the present disclosure are directed to PKE systems in the automotive industry. Consistent with one such embodiment, a key fob is used as part of a PKE system that provides functionality, such as remote car starting or remote keyless entry functions (e.g., unlocking of the vehicle and/or opening the trunk of a car). The key fob is configured to provide a variety of different features that are facilitated by the use of multiple wireless communication protocols and frequencies. These different communication protocols can require different antenna properties. For instance, a PKE system can include a key fob with each of an ultra high frequency (UHF) antenna (between 300 MHz and 3 GHz), a 3D LF antenna (between 30 kHz and 300 kHz) and an HF antenna (between 3 MHz and 30 MHz). Embodiments of the present disclosure are directed toward integration of two or more of such antennas into a single package. This can be particularly useful for reducing the PCB footprint, the key fob size and/or improving the receiving properties of the antenna (e.g., due to short PCB trace routes).

A particular embodiment of the present disclosure is directed toward a system that determines the location of a key fob using measurements from a 3D LF antenna. A base station transmits an LF signal that is detected by the key fob using the 3D LF antenna. The strength of the LF signal is used to determine the location of the fob with respect to the base station. The use of a 3D LF antenna allows for the key fob to detect LF signal of the base station regardless of the key fob's physical orientation. This is necessary because the LF antennas have a directional component that results in significantly attenuated signal strength when the antenna is not properly orientated with the transmitted LF signal.

In certain embodiments of the present disclosure, the base station includes multiple LF transmitters. The signal strength for each of the LF transmitters can be determined to ascertain the specific location of the fob in relation to the transmitters. This is facilitated by the use of a 3D-LF antenna that can receive signals from any direction and thereby receive signals from each of the LF transmitters simultaneously.

The PKE system can use such a determined location as part of a conditional check for the performance of various actions or functions. For example, the PKE system can prevent a vehicle door from being unlocked unless an associated fob is within 10 feet of the vehicle door. The PKE system can also perform various other functions based on the key fob location. For example, a car's headlights can be turned on as soon as the associated key fob comes within a first range (e.g., 20 feet from the car), and the car can unlock when the fob is within a second range (e.g., 10 feet from the car). The PKE system can also determine if the key is inside the car. This determination can be used to ensure that the key fob is not locked inside the car or that the car is not started unless the key fob is inside the car.

In certain embodiments of the present disclosure, a key fob includes an LF antenna transceiver circuit and a wakeup pattern detector. The key fob can also include a UHF antenna transceiver circuit that is activated in response to the LF antenna circuit receiving a specific wakeup pattern. In response to the key fob determining that a desired wakeup pattern has been received by the LF antenna circuit, the UHF antenna transceiver circuit is enabled for communication with the base station. For example, the UHF antenna circuit can be used to communicate security or other identifying information between the key fob and the base station. An HF antenna circuit can also be enabled in response to a wakeup pattern received by the 3D LF antenna circuit. In certain implementations of the present disclosure, the key fob can be configured so that an HF antenna circuit actively listens for a wakeup pattern that is transmitted using an HF frequency. In certain embodiments, the UHF antenna of the key fob and a UHF antenna on the base station are used to transmit data that functions as a security check to ensure that the key fob and base station match (e.g., both the key fob and base station have matching security codes). After it is determined the key fob and base station match, the key fob can send predetermined signals to the base station corresponding to requests for various functions to be performed, e.g., unlocking or starting of the vehicle.

In certain embodiments of the present disclosure, the PKE system includes a first base station that includes an LF frequency transceiver circuit and a second base station that transmits on an HF frequency transceiver circuit. The two base stations can be located in physically distinct locations relative to one another. For example, the first base station can be located within a vehicle, while the second base station is located within a garage, e.g., as part of a wireless garage door opening system.

Consistent with various embodiments of the present disclosure, a portable device is configured to communicate using a wireless protocol that is in compliance with ISO 14443 standards. This ISO 14443 standard is implemented using an HF antenna that is located within the same antenna package as a 3D LF antenna. This can be particularly useful for space saving (e.g., allowing for a small key fob) while allowing for communications both with a base station transmitting using an LF carrier frequency and a base station transmitting on an HF carrier frequency and protocol complying with ISO 14443. This can also be particularly useful for providing a high quality antenna solution, e.g., relative to a PCB antenna solution.

Figure 1:
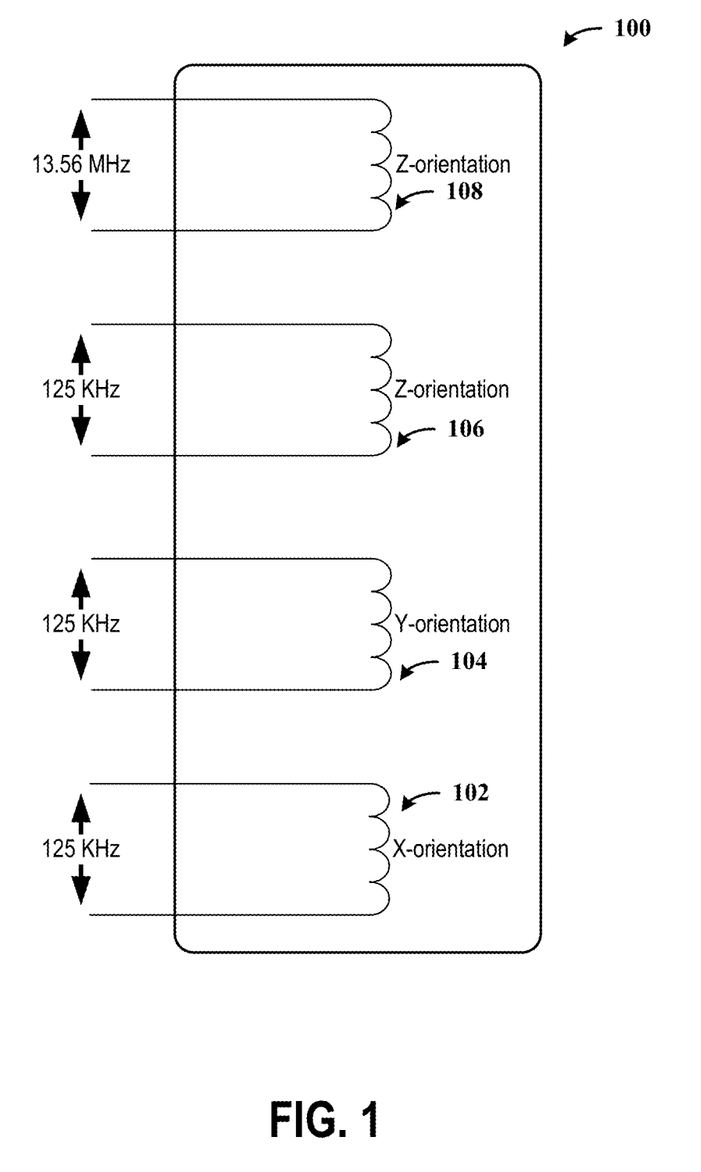
FIG. 1 depicts an antenna package with several coil antennas, consistent with an embodiment of the present disclosure.

Turning to FIG. 1, an antenna package 100 consistent with an embodiment of the present disclosure is depicted. The package includes three LF directional coil antennas (102, 104, 106). The three coils, when oriented correctly, form a 3D-LF antenna. The coils are each oriented relative to X, Y and Z axes that define a Cartesian coordinate system for a three-dimensional space. For instance, antenna 102 is a coil antenna oriented along the X-Axis; antenna 104 is a coil antenna oriented along the Y-Axis, and antenna 106 is a coil antenna oriented along the Z-Axis. In this manner each of the coil antennas is oriented parallel to a respective X, Y or Z plane, consistent with the Cartesian coordinate system.

Antennas 102, 104 and 106 are designed for communications using carrier frequencies between 30 kHz and 300 kHz. In certain more specific embodiments antennas 102, 104 and 106 are designed for use with a carrier frequency of 125 kHz. Package 100 includes a fourth antenna 108 that is oriented along the Z-Axis. Antenna 108 is designed for communications that use a carrier frequency of between 3 MHz and 30 MHz. In certain embodiments of the present disclosure, antenna 108 is designed for a carrier frequency that is 13.56 MHz.

As discussed herein, an antenna is designed for a particular carrier frequency by setting the reactance of the antenna according to the desired frequency. This reactance can be determined through the inductance and/or capacitance of the antenna. For instance, a coil antenna has an inductance value that corresponds to the number of windings in the coil, the type of core, the type of conductor used for the windings and other factors. The core can be air or a magnetic material such as ferrite, for example. The inductance for the LF coil antennas discussed herein is on the order of millihenries. For instance, the inductance of the LF antennas can be in the range of 1-8 mH for use with a carrier frequency of around 125 kHz. The HF coil antennas discussed herein have a lower inductance than the LF antennas. The inductance of the HF coil antenna can be on the order of microhenries. For instance, the inductance of the HF coil antenna can be in the range of 1.5-6.0 µH for use with a carrier frequency of about 13.56 MHz. The difference in inductance between the LF antennas and the HF antennas can be due to the smaller number of windings associated with the HF antenna relative to the number of windings of the LF antenna.

In certain embodiments, a specific position of a portable device is determined by measuring the field strength of a magnetic field using signals received from directional coils of a 3D LF antenna within the package 100. This can be particularly useful in Passive Keyless Entry (PKE) systems. In certain more specific embodiments, the PKE is used in connection with a vehicle. Determining that location of the portable PKE element that includes the antenna package can be useful to ensure a user is not locked out of the car, for example. Determining the location of the package can also be used to ensure that package 100 is within a specified distance before unlocking the car or popping the trunk, as further examples.

Consistent with a particular embodiment of the present disclosure, the antenna package is designed for placement on a PCB. Non-limiting examples of package types include a through-hole package, a surface mount package or a custom designed package. Although not necessarily limited thereto, custom designed packages can range in size from about 5 mm×5 mm to about 20 mm×20 mm with a height (i.e., perpendicular to the PCB upon placement of around 2-10 mm). The length and width dimensions of the package do not need to be equal. An example package can have dimensions of 11 mm×13 mm×5 mm. In other embodiments, the package size can be around 15 mm×15 mm with a height (i.e., perpendicular to the PCB upon placement) of around 5 mm. Non-limiting examples of surface mount packages include dual in-line packages (e.g., small-outline integrated circuit (SOIC) and shrink small-outline package (SSOP)), quad in-line packages (e.g., plastic leaded chip carrier (PLCC) and quad flat package (QFP)) and grid array packages (e.g., pin grid array (PGA) and ball grid array (BGA)). The sizes and package times discussed herein are merely illustrative of a few possible package sizes and can be adjusted depending upon the particular application and/or configuration of the coil antennas. The PCB footprint for the packages can be configured as desired, e.g., to include sufficient connections for use as both a 3D-LF antenna and an HF antenna with a relatively small footprint.

Figure 2:
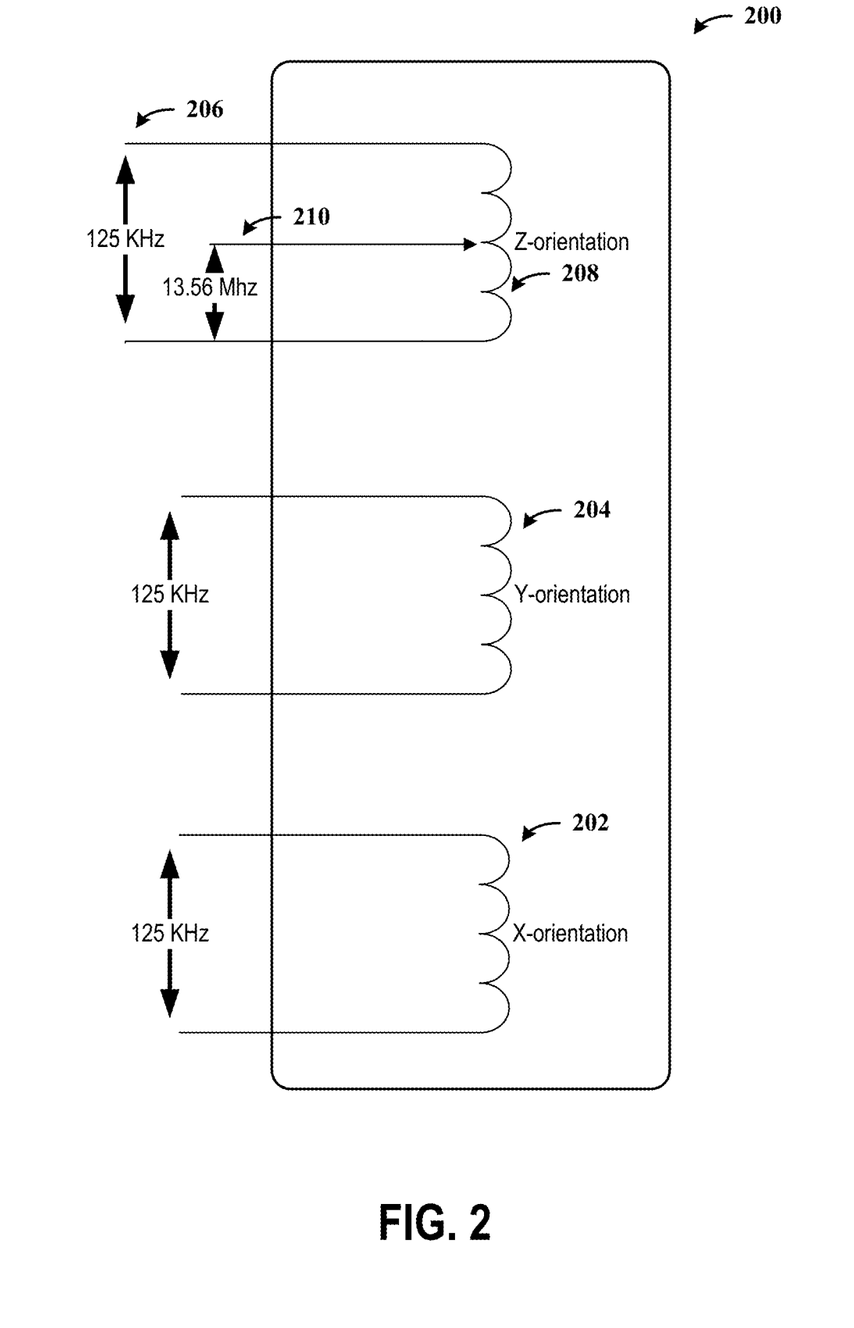
FIG. 2 depicts an antenna package with several coil antennas and a coil tap, consistent with an embodiment of the present disclosure.
Figure 3:
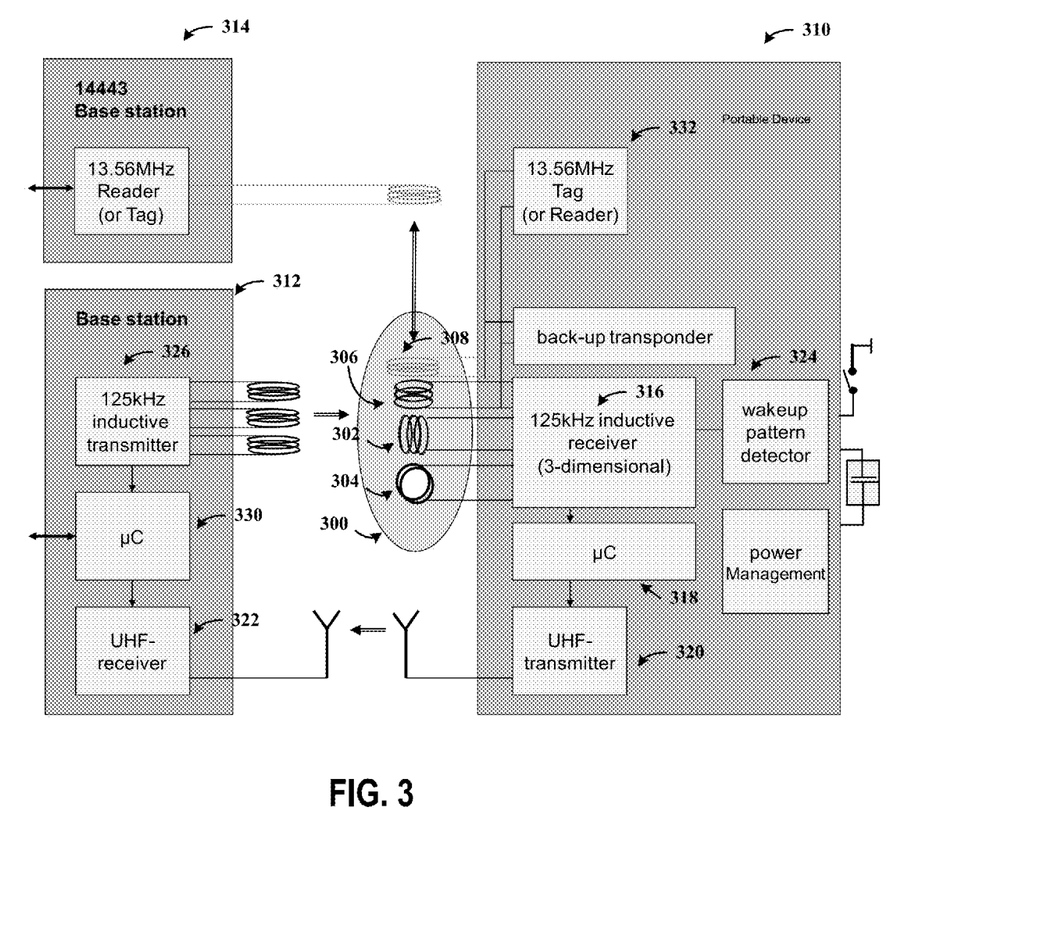
FIG. 3 depicts a communication system consistent with an embodiment of the present disclosure.

FIG. 2 depicts an antenna package with several coil antennas and a coil tap, consistent with an embodiment of the present disclosure. The antenna package 200 includes a 3D LF antenna that includes coil antenna 202 aligned on the X-axis, coil antenna 204 aligned on the Y-axis and coil antenna 206 aligned on the Z-axis. The LF coil antennas 202, 204, and 206 are designed for use with LF communications having a carrier frequency that is between 30 kHz to 300 kHz. In certain embodiments of the present disclosure, the carrier frequency is 125 kHz. Coil antenna 206 includes a tap 210 that is connected at a location between ends of windings of the coil antenna 206. This allows for a transceiver circuit to use fewer than all of the windings of coil antenna 206. In this manner, a portion 208 of coil antenna 206 can be used as an HF antenna that is designed for use with a carrier frequency between 3 MHz and 30 MHz. In certain embodiments of the present disclosure, the carrier frequency is 13.56 MHz. This allows for the effective inductance between one of the endpoints of coil antenna 206 and the tap 210 to be significantly less than the effective inductance between both coil endpoints of coil antenna 206. For instance, tap 210 can be placed so that portion 208 includes approximately ten percent of the coils relative to the number of coils of the entire coil antenna 206, which is approximately consistent with the ratio that could be used for an LF carrier frequency of 125 kHz and an HF carrier frequency of 13.56 MHz FIG. 3 depicts a communication system consistent with an embodiment of the present invention. A portable device 310 is configured to communicate with base stations 312 and 314 using an antenna package 300 that includes 3 LF coil antennas, 302, 304 and 306. Each of the antennas is oriented along a different axis. The LF coil antennas 302, 304 and 306 are antenna coupled to an inductive receiver 316. The inductive receiver 316 is a three-dimensional receiver that is configured to receive wireless signals using coil antennas 302, 304 and 306. The inductive receiver 316 can be configured to respond to an LF wakeup signal. For instance, wakeup pattern detector 324 determines whether the desired wake up pattern has been received. The use of a wakeup pattern allows for a portable device 310 to conserve energy by only enabling circuit components (e.g., an HF receiver or tag) in the presence of a base station. The wakeup signal can include an identifier that is unique to the specific portable device. Inductive transmitter 326 can be used to transmit the wake up signal. The use of the LF receiver and the 3D antenna in particular allows for the wake up signal to activate portions of portable device 310 only when it is within a prescribed area near the base station 312 transmitting the signal.

Antenna package 300 and inductive receiver 316 receive signals, including the wakeup signal, from inductive transmitter and antenna 326. The portable device 310 can conserve power by disabling various circuit components, such as microcontroller 318, UHF-transmitter 320 and/or HF tag or receiver 332. These circuit components can then be enabled in response to the receipt of a wakeup signal. The microcontroller 318 can be used to generate an authentication signal that UHF transmitter 320 can communicate to base station 312. Base station 312 can use the received authentication signal to verify that the portable device 310 has a valid identifier. The information sent to UHF-receiver 322 can also include information regarding the location of portable device 310 with respect to the base station 312. Microcontroller 330 processes the received signals and determines the actions to take. For example, if portable device 310 is a PKE key fob for a vehicle, then after authentication of the key fob, a signal can be sent from the base station to unlock the doors of the vehicle. The portable device 310 can also include an additional HF coil antenna 308, and associated reader 332.

In certain embodiments, the additional HF coil antenna 308 can be used to effect communications with a second base station 314. This can be used, for example, to provide a single fob for opening a garage door as well as unlocking a vehicle.

Figure 4:
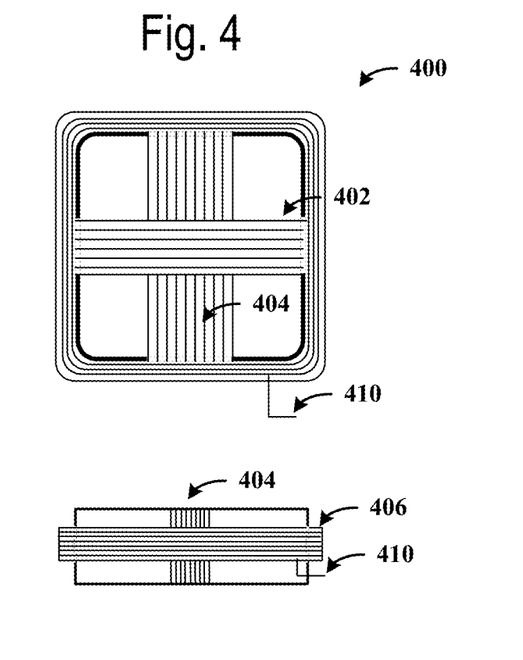
FIG. 4 depicts a 3D antenna package with a tap on one of the coil antennas, consistent with embodiments of the present disclosure.

FIG. 4 illustrates various ways in which the additional HF coil antenna can be implemented within a single antenna package consistent with embodiments of the present disclosure. Each of the figures includes views of the package from the top and from the side. Each of FIGS. 4-7 illustrates the additional HF coil antenna being oriented along the Z-axis; however, embodiments of the present disclosure can also be implemented with the HF coil oriented along or parallel to the X-axis or the Y-axis. This HF antenna is configured to be used in connection with an HF signal between 3 MHz and 30 MHz. The antenna package also includes a 3D LF antenna that includes three coil antennas oriented relative to or parallel to respective ones of the X, Y and Z axes. These axes define a Cartesian coordinate system for a three-dimensional space. The LF coil antennas can be configured for an LF signal of between 3 kHz and 300 kHz. In certain more embodiments, the HF antenna 508 is configured for use with a carrier frequency of 13.56 MHz and the LF coil antennas is configure for use with a carrier frequency of 125 kHz.

FIG. 4 depicts both the top and side views of an antenna package 400 with coil antenna 402 on the X-axis, coil antenna 404 on the Y-Axis, and coil 406 on the Z-axis. Coil antenna 406 includes a tap 410. The tap is located at a point along the coil of antenna 406 to allow for the coil antenna 406 to be used for both LF and HF carrier frequencies. For instance, an LF transceiver circuit can be connected across the entire coil length of the coil antenna 406, whereas the HF transceiver circuit can be connected across the tap and one end of coil antenna 406. Thus, the HF transceiver sees a lower effective inductance than the LF transceiver circuit, as would be consistent with the respective frequencies thereof. For example, the LF carrier frequency can be 125 kHz while the HF carrier frequency can be 13.56 MHz.

Figure 5:
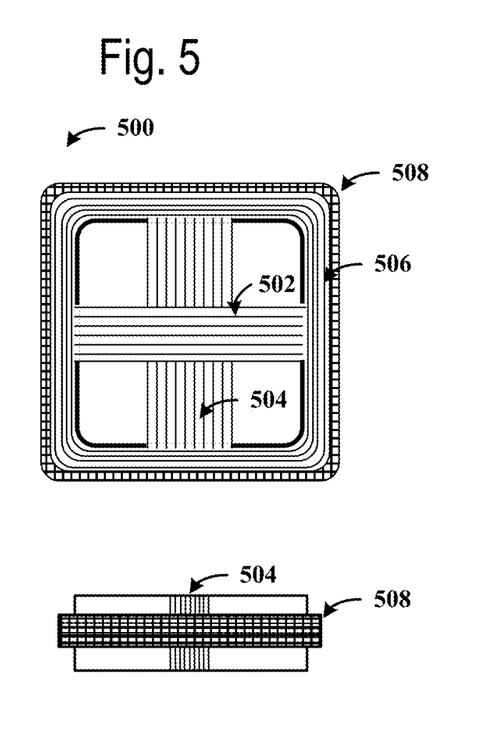
FIG. 5 depicts a 3D antenna package with an additional HF-frequency coil antenna surrounding one of the 3D coil antennas, consistent with embodiments of the present disclosure.

FIG. 5 depicts both the top and side views of an antenna package 500 including LF coil antennas 502 on the X-axis, 504 on the Y-axis, and 506 on the Z-axis. The antenna package 500 also includes a fourth coil antenna 508 which is wrapped around the outside of coil antenna 506 on the Z axis as illustrated. The antenna package can be constructed using a coil antenna 506 that has a number of windings that is consistent with the desired LF carrier frequency. Thereafter, coil antenna 508 can be constructed by winding the coil antenna 508 around the outside of coil 506 and using a number of windings that is consistent with the desired HF carrier frequency. Although not depicted, an embodiment of the present disclosure is directed toward an antenna package in which the LF coil antenna 506 is swapped with the HF coil antenna 508. Thus, the windings of LF coil antenna 506 are wrapped around the windings of the HF coil antenna 508.

Figure 6:
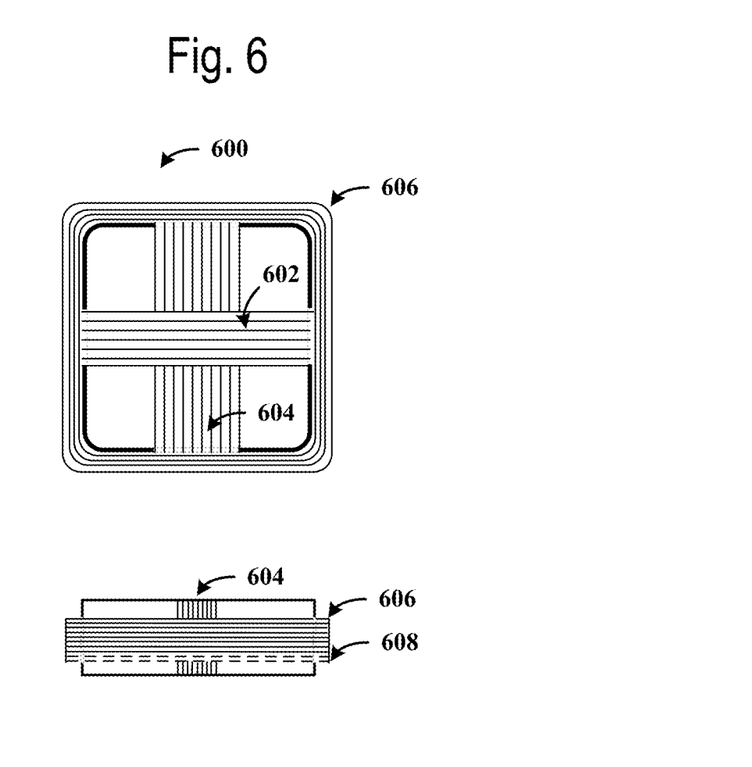
FIG. 6 depicts a 3D antenna package with an additional HF-frequency coil antenna below one of the 3D coil antennas, consistent with embodiments of the present disclosure.

FIG. 6 depicts both the top and side views of an antenna package 600 including both LF coil antennas and an HF coil antenna 608. The package 600 includes coil antenna 602 in the X direction, coil antenna 604 in the Y direction and coil antenna 606 in the Z direction. Consistent with one embodiment of the present disclosure, the HF coil antenna 608 is below (e.g., nearer to the PCB connection points) antenna 606 when the package 600 is viewed from the side and is depicted with the dashed lines. The two coil antennas 606 and 608 can be wound simultaneously, or one after the other depending upon the desired manufacturing process. The antenna package can be constructed using a coil antenna 606 that has a number of windings that is consistent with the desired LF carrier frequency. Coil antenna 608 can be constructed below coil 606 using a number of windings that is consistent with the desired HF carrier frequency. In an alternative embodiment, not shown, coil antenna 608 can be constructed above coil 606 using a number of windings that is consistent with the desired HF carrier frequency.

Figure 7:
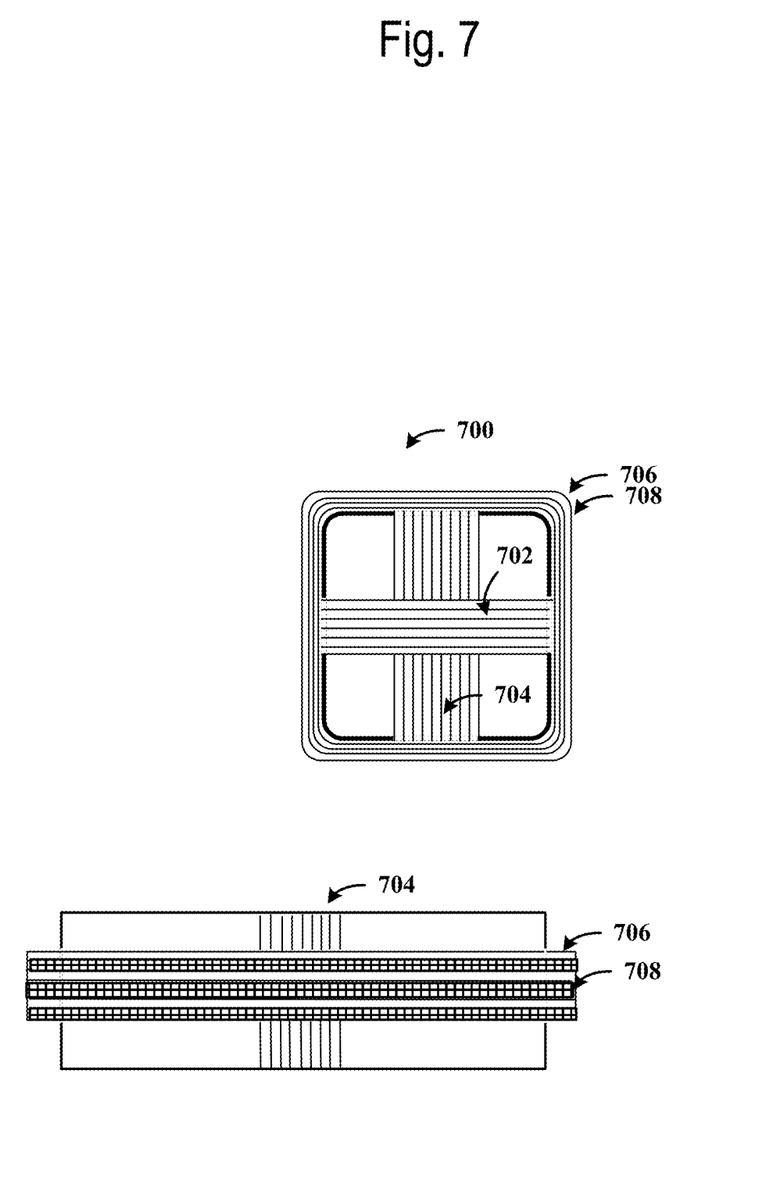
FIG. 7 depicts a 3D antenna package with an additional HF-frequency coil antenna alternating with one of the 3D coil antennas, consistent with embodiments of the present disclosure.

FIG. 7 depicts both the top and side views of an antenna package 700 including three LF coil antennas and an HF coil antenna 708. LF coil antenna 702 is located on the X-axis, LF coil antenna 704 is located on the Y-axis, and LF coil antenna 706 is located on the Z axis. FIG. 7 depicts and embodiment in which the windings of HF antenna 708 and LF coil antenna 706 alternate when the antenna package 700 is viewed from the side. As the LF coil antenna 706 will include more windings than the HF coil antenna 708, the windings do not necessarily alternate the entire length of the Z axis.

Consistent with an embodiment of the present disclosure, the antenna package can be constructed by winding two coils at the same time, one for coil antenna 706 and the other for coil antenna 708. This can be particularly useful for reducing manufacturing time and costs.

The length of the LF coil wire and the HF coil wire corresponds to a number of windings that is consistent with the desired carrier frequencies. In certain alternative embodiments, not shown, the windings are intermixed, such that, for example, there are two or more windings associated with the LF antenna between every one winding for the HF antenna. The disclosure contemplates a variety of intermixed embodiments.

Embodiments of the present disclosure relate to the use of a common coil antenna for communications using both HF and LF carrier frequencies. This includes, for instance, the use of a coil antenna having a tap that allows an HF transceiver circuit to be connected across less than all of the windings of the coil antenna and an LF transceiver circuit to be connected across all of the windings of the coil antenna. Various embodiments of the present disclosure relate to the configuration and design of the transceiver circuits to accommodate this shared usage.

One such embodiment relates to filtering of received signals by the transceiver circuits, e.g., to attenuate signals outside of the desired frequency range. In many applications, such filtering is sufficient even for embodiments in which coil antenna windings are shared between two transceiver circuits.

Other embodiments include an isolation circuit to electrically isolate the transceiver circuits from the coil antenna. This can be useful as the transceiver circuits may be adversely affected by external (relative to the antennas) capacitances added by the other transceiver circuit. Accordingly, one or more of the transceiver circuits can include a switch that isolates the transceiver circuit from the antenna when not in use. Thus, the LF transceiver circuit can be isolated from the coil antenna when the HF transceiver circuit is active and vice versa. For PKE-based systems, this can be particularly effective because the communications for each of the transceiver circuits can be implemented at a distinct time. For example, the HF transceiver circuit can be isolated from the coil antenna while the LF transceiver circuit is actively listening for a wakeup pattern. Once the wakeup pattern is detected, the LF transceiver circuit can be isolated to allow the HF transceiver circuit to communicate with a base station. Thereafter, the HF transceiver circuit can be isolated.

Consistent with another embodiment of the present disclosure, an active filtering can be implemented between the transceiver circuits. For instance, knowledge of the signal received by each transceiver circuit can be provided to the other transceiver circuit. This information can then be used to actively filter out such unwanted signals. This can be particularly useful for applications that use digital filtering.

The present disclosure uses the term transceiver circuit to denote a communication circuit that can be used as a receiver or a transmitter. Unless otherwise stated, the transceiver circuits discussed herein can also be implemented as a receive-only circuit or a transmit-only circuit.

Various embodiments described above and shown in the figures may be implemented together and/or in other manners. One or more of the items depicted in the drawings/figures can also be implemented in a more separated or integrated manner, or removed and/or rendered as inoperable in certain cases, as is useful in accordance with particular applications. For example, the HF antenna can be implemented on X, Y or Z axis. In view of the description herein, those skilled in the art will recognize that many changes may be made thereto without departing from the spirit and scope of the present disclosure.

What is claimed is:

1. A portable passive keyless entry device antenna assembly comprising:
    a surface mount package that includes
        a first coil antenna oriented parallel to an X plane and configured to receive a low frequency (LF) signal having a carrier frequency between 30 kHz to 300 kHz;
        a second coil antenna oriented parallel to a Y plane and configured to receive a low frequency (LF) signal having a carrier frequency between 30 kHz to 300 kHz;
        a third coil antenna having a plurality of windings and oriented parallel to a Z plane and configured to receive a low frequency (LF) signal having a carrier frequency between 30 kHz to 300 kHz;
        a fourth coil antenna having a plurality of windings and oriented parallel to a Z plane and configured to receive a high frequency (HF) signal having a carrier frequency between 3 MHz and 30 MHz, the windings of the third coil antenna are separated from one another by the windings of the fourth coil antenna; and
        wherein, viewed from above, the first coil and the second coil define a "+" shape, and the third coil has a rectangular shape surrounding the "+" shape and the fourth coil antenna has a rectangular shape surrounding the "+" shape.

2. The assembly of claim 1, wherein the surface mount package has a width between 5 mm and 20 mm, a length between 5 mm and 20 mm and a height between 2 mm and 10 mm, wherein windings of the third and fourth coil antennas are wound around a core, the windings of the third coil being separated from one another, and different windings of the fourth coil being located between different ones of the windings of the third coil.

3. The assembly of claim 1, wherein the fourth coil antenna is provided using a tap of the third coil antenna that allows for use of less than all of a set of windings of the third coil antenna.

4. The assembly of claim 1, wherein the coil antennas have an air core.

5. The assembly of claim 1, wherein the fourth coil antenna includes a set of coil windings independent of a set of coil windings for the third coil.

6. The assembly of claim 1, wherein
the fourth coil antenna and the third coil antenna share a common core,
the first, second, and third coil antennas are configured and arranged to receive an LF signal from a basestation, the signal strength of the LF signal being associated with a distance between the passive keyless entry device and the basestation, and
a microprocessor circuit configured and arranged to calculate the distance between the basestation and the passive keyless entry device using the received LF signal, wherein the passive keyless entry device is configured and arranged to activate a door unlock function of the basestation by transmitting a HF signal to the basestation from the fourth coil antenna, in response to the calculated distance between the basestation and the passive keyless entry device being less than 10 feet.

7. The assembly of claim 1, wherein windings of the fourth coil antenna are wound around the outside of the third coil antenna relative to a third coil antenna core.

8. The assembly of claim 1, wherein the first coil antenna, the second coil antenna, and the third coil antenna are configured to receive a common carrier frequency.

9. The assembly of claim 2, wherein the first coil antenna, the second coil antenna and the third coil antenna each have an inductance being between 1 mH and 8 mH.

10. A portable passive keyless entry device comprising:
a printed circuit board (PCB) having
a low frequency (LF) receiver circuit configured and arranged for communicating an LF signal having a carrier frequency between 30 kHz to 300 kHz;
a high frequency (HF) transceiver circuit configured and arranged for producing a high frequency (HF) signal having a carrier frequency between 3 MHz and 30 MHz;
a microprocessor circuit configured and arranged for receiving an activation signal from the LF receiver circuit and in response thereto,
communicating authentication information using the HF transceiver circuit; and
an antenna package that connects to the PCB and that houses
a first coil antenna oriented parallel to a X plane and configured to receive the LF signal,
a second coil antenna oriented parallel to a Y plane and configured to receive the LF signal,
a third coil antenna having a plurality of windings and oriented parallel to a Z plane and configured to receive the LF signal;
a fourth coil antenna having a plurality of windings and oriented parallel to the Z plane and configured to receive and transmit the HF signal, the windings of the third coil antenna being separated from one another by the windings of the fourth coil antenna; and
wherein, viewed from above, the first coil and the second coil define a "+" shape, and the third coil has a rectangular shape surrounding the "+" shape and the fourth coil antenna has a rectangular shape surrounding the "+" shape.

11. The device of claim 10, wherein the portable passive keyless entry device is a key fob.

12. The device of claim 10, wherein the fourth coil antenna is provided using a tap of the third coil antenna that allows for use of less than all of a set of windings of the third coil antenna.

13. The device of claim 10, wherein the LF coil antennas have an inductance that is between 1 mH and 8 mH.

14. The device of claim 10, wherein the fourth coil antenna includes a separate set of windings relative to windings of the third coil antenna.

15. The device of claim 10, wherein the fourth coil antenna has an inductance between 1.5 µH and 6.0 µH.

16. The device of claim 10, wherein windings of the fourth coil antenna are intermixed with windings of the third coil antenna.

17. The device of claim 10, wherein fourth coil antenna windings are between the PCB and windings of the third coil antenna.

18. A portable passive keyless entry device communication circuit comprising:
a printed circuit board (PCB);
an antenna package connected to the PCB and including
a three-dimensional radio antenna configured to receiving radio frequency signals in three dimensions according to axes X, Y and Z and including
a first coil oriented parallel to a plane of the X axis,
a second coil oriented parallel to a plane of the Y axis, and
a third coil having a plurality of windings and oriented parallel to a plane of the Z axis, the third coil including a first set of windings and a second set of windings;
wherein, viewed from above, the first coil and the second coil define a "+" shape, and the windings of third coil have a rectangular shape surrounding the "+" shape and a fourth coil antenna having a plurality of windings with a rectangular shape surrounding the "+" shape, the windings of the third coil antenna being separated from one another by the windings of the fourth coil antenna; and
a first communication circuit on the PCB and for communicating a low frequency (LF) signal having a carrier frequency between 30 kHz to 300 kHz, the first communication circuit including
one or more processing circuits configured to code communications carried on the LF signal;
a first electrical connection configured to communicate the LF signal between the one or more processing circuits and the first coil;
a second electrical connection configured to communicate the LF signal between the one or more processing circuits and the second coil;

a third electrical connection configured to communicate the LF signal between the one or more processing circuits and the third coil, wherein the first set of windings is connected to the third electrical connection; and a second communication circuit on the PCB and for producing a high frequency (HF) signal having a carrier frequency between 3 MHz and 30 MHz, the second communication circuit including one or more processing circuits configured to code communications carried on the HF signal; and a fourth electrical connection configured to communicate the HF signal between the one or more processing circuits and the third coil, wherein the second set of windings is connected to the fourth electrical connection.

19. The circuit of claim 18, wherein the PCB includes a top surface upon which the first communication circuit is located, the top surface perpendicular to the Z axis.

20. The assembly of claim 1, further including a low frequency (LF) receiver circuit coupled to the first, second, and third coil antennas and configured and arranged to receive an LF activation signal having a carrier frequency between 30 kHz to 300 kHz via the first, second and third coil antennas, a high frequency (HF) transceiver circuit coupled to the fourth coil antenna and configured and arranged to transmit HF data having a carrier frequency between 3 Mhz and 30 Mhz, the fourth coil antenna being separated and offset from the third coil antenna, and a microprocessor circuit coupled to the LF receiver circuit and to the HF transceiver circuit, the microprocessor circuit being configured and arranged to, in response to receiving the LF activation signal from the LF receiver circuit, communicate authentication information via the HF transceiver circuit.

* * * * *